US011353550B2

United States Patent
Bouchayer et al.

(10) Patent No.: US 11,353,550 B2
(45) Date of Patent: Jun. 7, 2022

(54) TEMPERATURE SENSOR SYSTEM, RADAR DEVICE AND METHOD THEREFOR

(71) Applicant: NXP USA, INC., Austin, TX (US)

(72) Inventors: Matthis Bouchayer, Toulouse (FR); Cristian Pavao Moreira, Frouzins (FR); Andres Barrilado Gonzalez, Toulouse (FR)

(73) Assignee: NXP USA, Inc., Austin, TX (US)

( * ) Notice: Subject to any disclaimer, the term of this patent is extended or adjusted under 35 U.S.C. 154(b) by 473 days.

(21) Appl. No.: 16/410,013

(22) Filed: May 13, 2019

(65) Prior Publication Data

US 2020/0057138 A1 Feb. 20, 2020

(30) Foreign Application Priority Data

Aug. 14, 2018 (EP) .................................. 18306115

(51) Int. Cl.
| | |
|---|---|
| G01S 7/40 | (2006.01) |
| G01K 1/26 | (2006.01) |
| G01S 7/35 | (2006.01) |
| G01K 1/02 | (2021.01) |

(52) U.S. Cl.
CPC .............. *G01S 7/40* (2013.01); *G01K 1/026* (2013.01); *G01S 7/35* (2013.01)

(58) Field of Classification Search
CPC .............. G01S 7/40; G01S 7/35; G01K 1/026
See application file for complete search history.

(56) References Cited

U.S. PATENT DOCUMENTS

| | | | |
|---|---|---|---|
| 6,211,623 B1 | 4/2001 | Wilhelm et al. | |
| 7,524,107 B1 * | 4/2009 | Lorenz .................. | G01K 3/005 |
| | | | 324/417 |
| 8,970,234 B2 * | 3/2015 | Takayanagi ........... | G01K 3/005 |
| | | | 324/750.03 |
| 9,791,493 B2 | 10/2017 | Bandyopadhyay et al. | |
| 2015/0185293 A1 | 7/2015 | Milano et al. | |
| 2015/0241553 A1 | 8/2015 | Gehrels et al. | |
| 2017/0315214 A1 | 11/2017 | Steinbuch et al. | |

FOREIGN PATENT DOCUMENTS

| | | |
|---|---|---|
| DE | 102004020282 A1 | 7/2006 |
| DE | 102012201990 A1 | 8/2013 |

OTHER PUBLICATIONS

Parsons, M., "Thermal Monitoring System for Aircraft Cargo Bay Fire Safety", 2417 Optical Engineering, vol. 30, No. 11, pp. 1668-1673, Nov. 1991.

* cited by examiner

*Primary Examiner* — Erin F Heard
*Assistant Examiner* — Taher Al Sharabati

(57) ABSTRACT

A radar device (100) is described that includes at least one transceiver (105) configured to support frequency modulated continuous wave (FMCW); radar device (100) and a digital controller (262). A temperature sensor system includes a plurality of temperature sensors (222, 232, 242) coupled to one or more circuits (220, 230, 240) in the at least one transceiver (105). The digital controller (262, 306) comprises or is operably coupled to an over-temperature emulation circuit (308) configured to emulate an over-temperature shutdown state by injecting an over-temperature force signal (290) into the temperature sensor system (270).

20 Claims, 5 Drawing Sheets

US 11,353,550 B2

TEMPERATURE SENSOR SYSTEM, RADAR DEVICE AND METHOD THEREFOR

CROSS-REFERENCE TO RELATED APPLICATIONS

This application claims the priority under 35 U.S.C. § 119 of European Patent application no. 18306115.9, filed on 14 Aug. 2018, the contents of which are incorporated by reference herein.

FIELD OF THE INVENTION

The field of the invention relates to a temperature sensor system for a frequency modulated (FM) radar device, such as a FM continuous wave (FMCW) radar device, and a method for calibrating an out of temperature condition.

BACKGROUND OF THE INVENTION

The application of automotive radar systems is evolving towards use in fully autonomous cars, which significantly increases the technical demands, particularly in terms of functional safety. Radar systems often consist of a multi-chip solution, combining a radar transceiver (TRx) integrated circuit (IC), a microcontroller unit (MCU) IC and radar sensors. New safety requirements (e.g. as defined in ISO26262) impose specifications that require checking that the radar sensor is operating under a safe state, before the radar device transitions into a functional state (where data processing is performed, and the radar device and the vehicle are able to make 'intelligent', autonomous decisions). Safety mechanisms, such as temperature sensors, detectors, etc., are then implemented within the radar device in order to track or detect malfunctioning components and circuits in order to satisfy the safety goals or requirements. Thus, as safety is a main concern for such automotive radar systems, several types of sensors are also integrated in such multi-chip solutions, to ensure that the radar device is functioning in safe operating conditions. In such applications, temperature sensors and related temperature sensor systems are of particular importance, since they detect if the device is operating within a safe temperature range.

However, these safety mechanisms require testing, in order to guarantee that they do not miss a malfunction or wrongly detect a malfunctioning in the radar device. This safety check is normally performed before each start up, for example in a Built-in self-test (BIST) mode of operation. In a radar device transceiver, it is important to accurately sense the temperature independently of the radar device state. For example, in use, there is a need to determine whether the sensor is under an over-temperature condition in a low power state (or idle state), and this even before starting transmitting and receiving data. Additionally, it is important to avoid a situation where out-of-band transmissions occur (for example) for a small time period (before an error flag is raised) due to a circuit potentially malfunctioning. Indeed, in other examples, tracking an over-temperature condition in early stage of the state machine (or system state) may avoid processing incorrect data by the MCU (externally). Furthermore, accurately sensing the temperature independently of the radar device state may prevent the system from starting if it is not in an initial safe condition. Two modes/states of operation for temperature sensing are typically employed: (i) an 'IDLE' state where no internal clock is available and (ii) all other functional states, where an internal clock is made available. The way that the temperature sensing system is managed and monitored in each mode is, thus, different. A typical temperature sensing system includes both analog and digital parts (often implemented in separate integrated circuits) In order to provide good accuracy and programmability.

Current radar systems generally specify an over-temperature shutdown operation with programmable thresholds for a majority of the radar device's functional states. The temperature tracking and over-temperature shutdown operation is typically viewed as a four step process, including: sensing, converting, digitizing, and reading. If an over-temperature is detected, a shutdown is performed in order to cool down the integrated circuit (sometimes referred to as 'chip').

US 2015/0241553 A1 describes a radar data processing system that employs several sensors. Including one or more temperature sensors used for monitoring the temperature, and adapts the transmitter to ensure that the transmitter is operating within the approved operating conditions. U.S. Pat. No. 8,970,234 B2 describes a threshold-based temperature-dependent power/thermal management concept with temperature sensor calibration. In this document, temperature readings from a temperature sensor are measured and reported to a power management unit. This unit may be configured to periodically compare temperature readings from the temperature sensing units and may perform control actions to ensure that an IC is operating within the designated thermal limits, to avoid heat related damage.

Accordingly, it is important to provide temperature sensing, and in particular accurate over-temperature sensing, whilst generating or processing modulation signals for FMCW radar devices.

SUMMARY OF THE INVENTION

The present invention provides a FM radar device, a temperature sensing system for such a FM radar device, and a method therefor as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
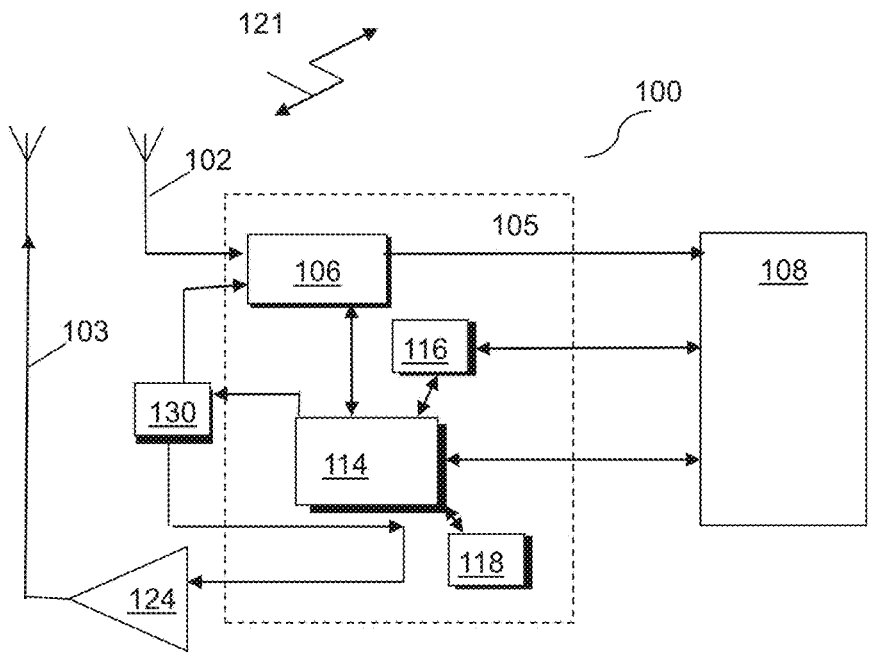
FIG. 1 illustrates a simplified block diagram of a radar device, adapted in accordance with examples of the invention.

A temperature sensor is known to provide temperature-dependent information, for example a voltage or current in a diode-based structure, a frequency in a ring oscillator structure, etc. This information (either in an analog form or a digitally converted form) is read in a system that employs a temperature sensor, such as a radar device, and an over-temperature check will generate a flag if the read information is beyond an acceptable temperature limit. There is a desire to implement more accurate over-temperature sensing, irrespective of an operational state of the temperature sensor or the electronic unit that hosts the temperature sensor.

In this regard, examples of the invention propose a mechanism to emulate an over-temperature situation by changing a parameter of the sensing unit during a test mode, in order to significantly shift the temperature-dependent information and thus, in some examples, intentionally trigger a flag (which is typically generated by an over-temperature sensor in a functional mode) that confirms that the method and circuitry associated with the over-temperature mechanism works correctly, thereby avoiding false flags (or an absence of flags) during normal operation.

Examples of the invention are described with reference to an over-temperature state, over-temperature check, over-temperature sensor and over-temperature shut-down if the determined temperature exceeds prescribed limits. However, in accordance with examples of the invention, the examples described herein apply equally to under-temperature shutdown if the determined temperature is below a prescribed temperature limit. Thus, the term 'over-temperature', hereinafter used, encompasses both 'over-temperature' and 'under-temperature' situations and emulation of over and/or under temperature shutdown and, thus, relates to a temperature being outside of a prescribed limit, e.g. outside a normal operation condition range (say for temperature (T): T>150° C., but also for T<−40° C.).

In examples of the invention, circuits and a method are proposed to emulate an over-temperature scenario, within a self-test operation that includes a fault injection to the temperature sensing system. In this manner, the emulation identifies whether (or not) the radar safety system is able to operate correctly, before the device is placed in functional or normal operation mode. In some examples, the circuits and the method relate to emulating an over-temperature shutdown state with such a fault injection, may be achieved regardless of the actual temperature of the circuit. A further benefit of injecting a fault in the first stages of a sensing system is that it may increase the coverage of faults happening across the sensing system circuitry.

In some examples of the invention, the temperature may be translated to a measurable parameter (voltage, current, frequency) sensed by the sensing unit. In some described examples, the parameter change over temperature may be an analog voltage (for example in a differential form) and then converted into a single-ended form), and thereafter converted to a digital code. In some examples, by changing a current applied to a diode within a diode-based structure of the sensing unit, the voltage and digital code may be configured to move out of its pre-selected threshold value, and in this manner emulate an over-temperature situation.

Although examples of the invention are described with respect to FMCW radar systems, it is envisaged that examples of the invention may be used with any kind of frequency modulation (FM) technique (e.g. FM, FMCW, FMCW-frequency shift keyed (FSK), etc.) that is sensitive to glitches. In some examples, the described temperature sensor system includes several sensors and common circuitry in order to reduce die area, and may be used in any type of temperature-sensitive, sensor-based device.

Examples of the invention describe a radar device that includes at least one transceiver configured to support frequency modulated continuous wave (FMCW); a digital controller; and a temperature sensor system comprising a plurality of temperature sensors coupled to one or more circuits in the at least one transceiver. The digital controller comprises or is operably coupled to an over-temperature emulation circuit configured to emulate an over-temperature shutdown state, irrespective of a temperature of a sensor of the plurality of temperature sensors. In examples of the invention, the over-temperature emulation circuit is configured to emulate an over-temperature shutdown state by injecting an over-temperature (force) signal into the temperature sensor system, for example during a built-in self-test mode of operation. In some examples, the over-temperature emulation circuit may be configured to emulate an over-temperature shutdown state by injecting an over-temperature signal successively in each of the plurality of temperature sensors and wherein the digital controller may be configured to determine a true over-temperature performance of each of the plurality of temperature sensors based thereon. In this manner, the digital controller is better able to determine whether a true over-temperature condition may arise in normal operation, by emulating such conditions during a test mode.

Referring now to FIG. 1, a simplified block diagram of a radar device 100 operating at millimeter wave (MMW) frequencies is illustrated, in accordance with examples of the invention. The radar device 100 contains one or several antennas 102 for receiving radar signals 121, and one or several antennas 103 for transmitting radar signals 121, with one respective antenna shown for each for simplicity purposes only. The number of antennas 102, 103 used may depend on the number of radar transceivers 105 and radar receiver and transmitter channels that are implemented in a given radar device. One or more receiver chains, as known in the art, include receiver front-end circuitry 106, effectively providing reception, frequency conversion, filtering and intermediate or base-band amplification, and finally an analog-to-digital conversion. In some examples, a number of such circuits or components may reside in signal processing module 108, dependent upon the specific selected architecture. The receiver front-end circuitry 106 is coupled to the signal processing module 108 (generally realized by a digital signal processor (DSP)). A skilled artisan will appreciate that the level of integration of receiver circuits or components may be, in some instances, implementation-dependent.

A digital controller 114, for example in a form of a microcontroller unit (MCU), maintains overall operational control of the radar device 100, and in some examples may comprise time-based digital functions (not shown) to control the timing of operations (e.g. transmission or reception of time-dependent signals, FMCW modulation generation, etc.) within the radar device 100. The controller 114 is also coupled to the receiver front-end circuitry 106 and the signal processing module 108. In some examples, the controller 114 is also coupled to a memory device 116 that selectively stores operating regimes, such as decoding/encoding functions, and the like.

As regards the transmit chain, this essentially comprises a power amplifier (PA) 124 coupled to the transmitter's one or several antennas 103, antenna array, or plurality of antennas. In radar device 100, radar transceiver topology is different from traditional wireless communication architectures (e.g. Bluetooth™, WiFi™, etc.), as modulation occurs within a phase locked loop (PLL) (typically via a fractional-N divider), and is applied directly to the PA 124. Therefore, in some examples, the receiver front-end circuitry 106 and transmitter PA 124 are coupled to frequency generation circuit 130 arranged to provide local oscillator signals. The generated local oscillator signals are thus modulated directly to generate transmit radar signals, and also used to down-convert received modulated radar signals to a final intermediate or baseband frequency or digital signal for processing in a receive operation.

In accordance with examples of the invention, at least one transceiver of the radar device 100, for example including at least one transceiver, is configured to support frequency modulated continuous wave (FMCW). A temperature sensor system 118 includes a plurality of temperature sensors coupled to various circuits in the at least one transceiver. The digital controller 114 is typically configured to monitor a temperature of the various circuits by polling temperature values of the plurality of temperature sensors.

In FIG. 1, a single signal processor 108 or single microcontroller unit (MCU) 114 may be used to implement a processing of received radar signals. Clearly, the various components within the radar device 100 can be realized in discrete or integrated component form, with an ultimate structure therefore being an application-specific or design selection. A skilled artisan will appreciate that the level of integration of circuits or components may be. In some instances, implementation-dependent.

Figure 2:
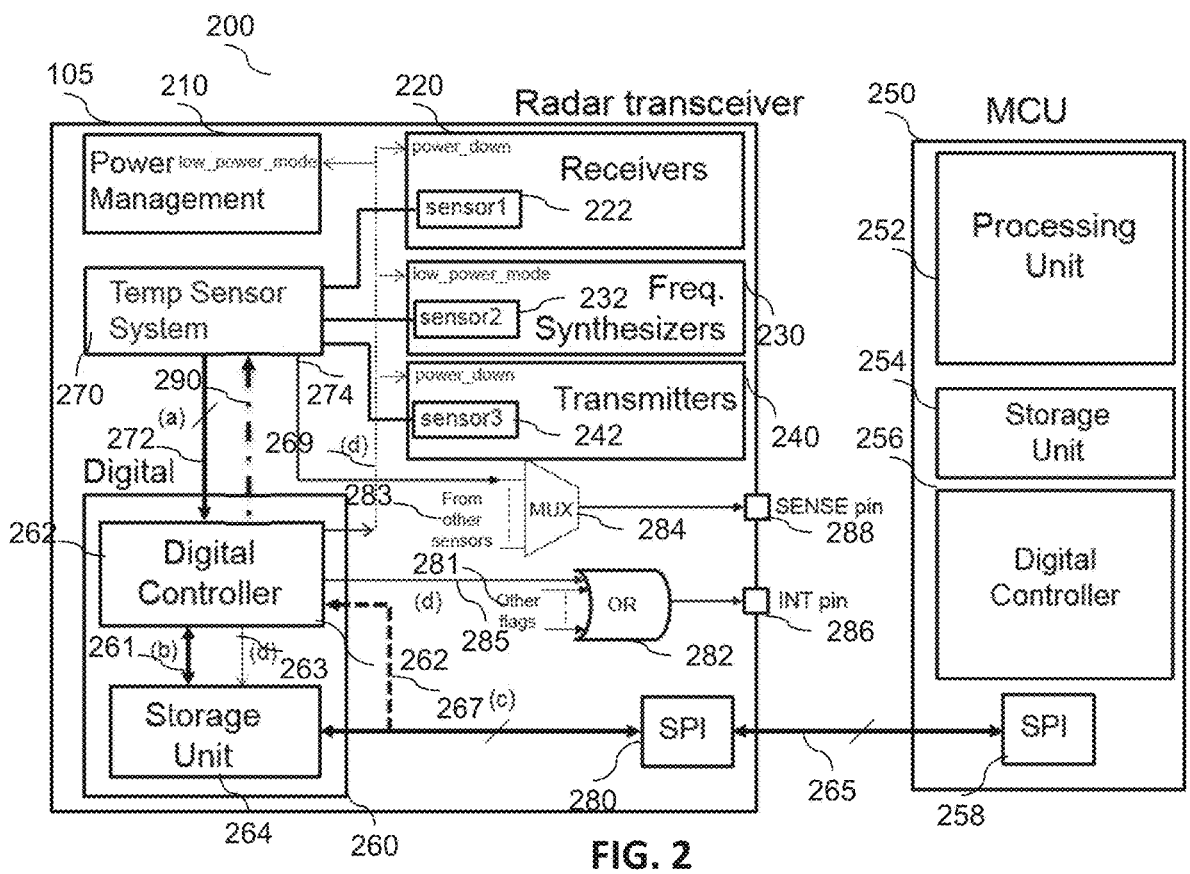
FIG. 2 illustrates an example block diagram of a radar device with a radar transceiver and high-level temperature sensor circuit, in accordance with examples of the invention.

Referring now to FIG. 2, an example block diagram of a radar device 200 with a radar transceiver and high-level temperature sensor circuit, is illustrated in accordance with examples of the invention. A radar transceiver 105 includes a power management function 210, which may be in a form of a power management IC, and one or more receivers 220, frequency synthesizers 230, transmitters 240. Each of the one or more receivers 220, frequency synthesizers 230, transmitters 240, may include one or more respective temperature sensors 222, 232, 242 coupled to a temperature sensor system 270. The radar transceiver 105 also includes a digital part, which may be in a form of a digital IC 260, which includes a digital controller 262, which may include some functionality of the MCU 114 from FIG. 1, operably coupled 261 to a storage device 264, such as registers and/or memory. The power management function 210 generates reference currents and voltages that are needed within radar device 200.

In this example, the frequency synthesizers 230 include all the functionality related to a generation of the reference frequencies and radar frequencies to be transmitted. The transmitters 240 contain the functionality related to the emitted radar signal, whilst the receivers 220 are dedicated to the reception and conversion of the reflected and received radar signal. Amongst all the sensors implemented (with only a few potential sensors illustrated in FIG. 2 for simplicity purposes only), the temperature sensor system 270 is configured to sense operating temperatures at different locations of the radar transceiver 105. In this example, the digital controller 262 takes the values from the temperature sensor system via bus 272. These values are stored in the registers of the storage unit 264. These values can also be read by the user via the serial peripheral interfaces (SPIs) 280, and SPI 258 associated with the MCU 250, via bus 265. The digital controller 262 of the radar transceiver 105 is also directly connected to SPI 280. The MCU 250 includes a processing unit 252, a storage unit 254, a digital controller 256 and SPI 258 to communicate with the radar transceiver 105. The processing unit 252 is responsible for the digital signal processing of the data received from the radar transceiver 200, this data being, say, representative of a radar target speed, distance or speed variation. The storage unit 254 is the general memory of the MCU 250 that is responsible for both dynamic data storage (random access memory (RAM) and/or flash memory) as well as read only memory (ROM) (static) data storage. The digital controller 256 is in charge of the communication between all MCU different blocks and units, together with sequencing all the process (state machine) for the correct operation of the MCU 250 and controlling the interface of MCU with other circuits (e.g. Radar Transceiver).

In accordance with examples of the invention, the digital controller 262 comprises or is operably coupled to an over-temperature emulation circuit that is configured emulate an over-temperature scenario, for example within a self-test operation, in response to a fault injection to the temperature sensing system. The digital controller 262 is then configured to measure a physical parameter that has changed in response to the fault injection, and compare the measured physical parameter with at least one pre-set threshold value (or set of threshold values). In response to the measured physical parameter exceeding the at least one pre-set threshold value, the fault injection and measured physical parameter are stored in memory, such as storage unit 254, to indicate a true over-temperature condition of the temperature sensor system. In some examples, the digital controller 262 may also initiate the generation of at least one flag that indicates an out of range temperature condition in response to the determined true over-temperature condition of the temperature sensor system. In this manner, the emulation identifies whether (or not) the radar safety system is able to operate correctly, before the device is placed in functional or normal operation mode. In some examples, the circuits and the method relate to emulating an over-temperature shutdown state with such a fault injection, may be achieved regardless of the actual temperature of the circuit. A further benefit of injecting a fault in the first stages of a sensing system is that it may increase the coverage of faults happening across the sensing system circuitry.

In some examples, the stored values may also be compared to programmable thresholds (not shown). If a stored value is, say, higher than a 'high' threshold it may indicate that there is an over-temperature on the IC. In this instance, a flag may be generated by the digital controller 262 and the fault condition stored in a fault register via path 263. Similarly, in some examples, if the stored value is, say, lower than a 'low' threshold it may indicate that there is an under-temperature on the IC. In this instance, a flag may also be generated by the digital controller 262 and the fault condition stored in a fault register via path 263. As the IC should operate in safe conditions, a radar device shutdown may be proceeded with in either situation.

In a shutdown situation, the digital controller 262 sends the ICs into a power-save mode in order to cool down the chip. In a typical example, receivers 222 and transmitters 242 are powered down, whilst frequency synthesizers 232 and power management function 210 are placed into a low power mode via, say, control signals sent on path 269. Also, in some examples, a flag 285 (from a number of potential flags 281), may be sent from the digital controller 262 to the interrupt (INT) pin 286 via an 'OR' logic gate 282 in order to indicate externally (e.g. to a master device of the radar system) that an interrupt event has happened. The analog value from the temperature sensor system can then also be routed and measured on a SENSE pin 288 through, say, a multiplexer 284.

In accordance with examples of the invention, the radar device includes at least one transceiver 105 configured to support frequency modulated (FM) radar signals, such as FMCW radar signals; and digital controller 262. Temperature sensor system that includes a plurality of temperature sensors 222, 232, 242 coupled to various circuits such as transmitter 240, receiver 220, frequency generation circuit 230. The digital controller 262 is configured to monitor a temperature of the various circuits by tracking dynamically the temperature of the plurality of temperature sensors 222, 232, 242.

In some examples, the digital controller 262 (which may form a part of the controller 114 in FIG. 1) comprises or is operably coupled to an over-temperature emulation circuit configured to emulate an over-temperature shutdown state, irrespective of a temperature of a sensor of the plurality of temperature sensors. In some examples, the over-temperature emulation circuit may be configured to emulate an over-temperature shutdown state by changing a parameter of the sensing unit during a test mode, in order to significantly shift the values that indicate temperature-dependent information. In some examples, the method changing a parameter of the sensing unit is achieved by injecting an over-temperature signal 290 into the temperature sensor system during a built-in self-test mode of operation. In some examples, the over-temperature emulation circuit may be configured to emulate an over-temperature shutdown state by injecting an over-temperature signal 290 successively in each of the plurality of temperature sensors 222, 232, 242, and wherein the digital controller 262 may be configured to determine a true over-temperature performance of each of the plurality of temperature sensors 222, 232, 242 based thereon. In some examples, the significant shift of values that indicate temperature-dependent information may be configured to trigger a flag (which is typically generated by an over-temperature sensor in a functional mode). In this manner, the digital controller can reliably determine whether a true over-temperature condition may arise in normal operation, by emulating such conditions during a test mode.

Figure 3:
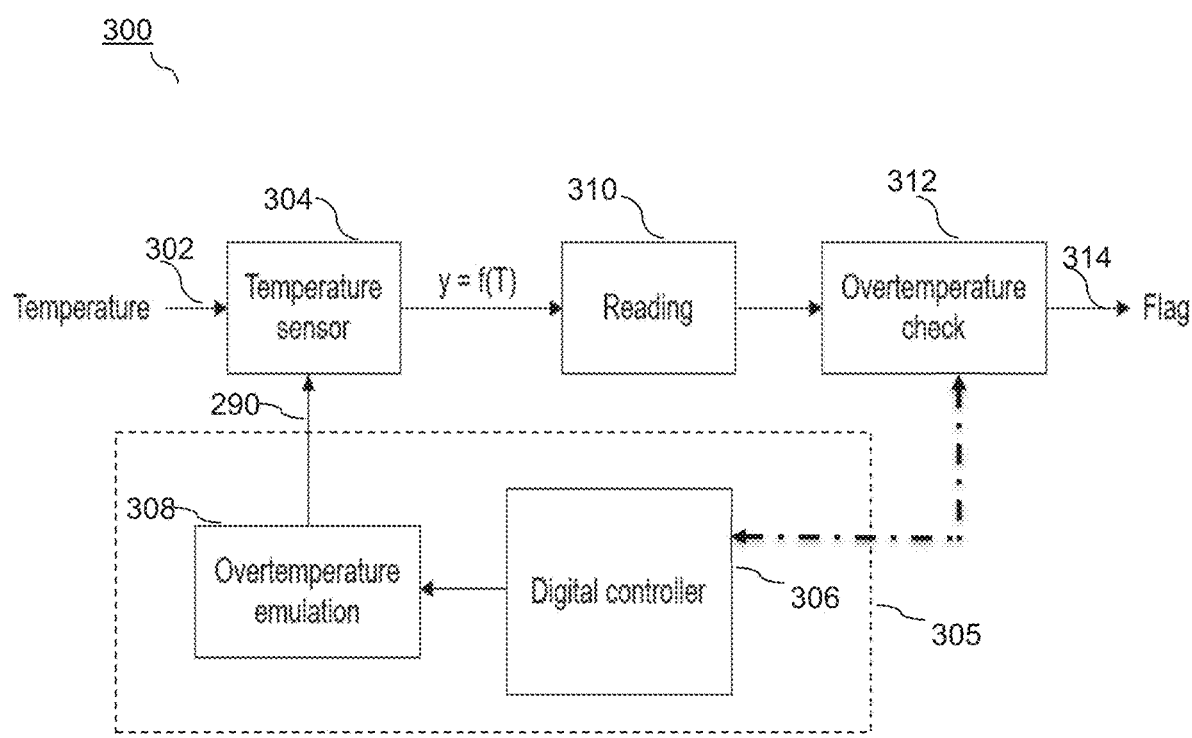
FIG. 3 illustrates a simplified flowchart of a temperature sensor system, in accordance with examples of the invention.

Referring now to FIG. 3, a temperature sensor with over-temperature emulation flowchart 300 is presented, by the radar device, such as radar device 100 of FIG. 1. In this example, during a normal mode of operation, a temperature 302 of a circuit or component is passed to a temperature sensor 304 and the temperature measured/read at 310. An over-temperature check is then made, for example by comparing the measured/read temperature with an over-temperature threshold value 312. If the measured/read temperature exceeds the over-temperature threshold value 312, then a flag is generated at 314.

In accordance with examples of the invention, a test mode of operation 305 (e.g. a BIST mode) encompasses a digital controller 306 generating an over-temperature signal 290 that emulates an over-temperature condition 308. The over-temperature signal 290 is then provided to the temperature sensor 304 to mimic a signal levels that will occur in a true over-temperature situation. This information is collated and analysed by the digital controller 306 during the test mode of operation 305.

Figure 4:
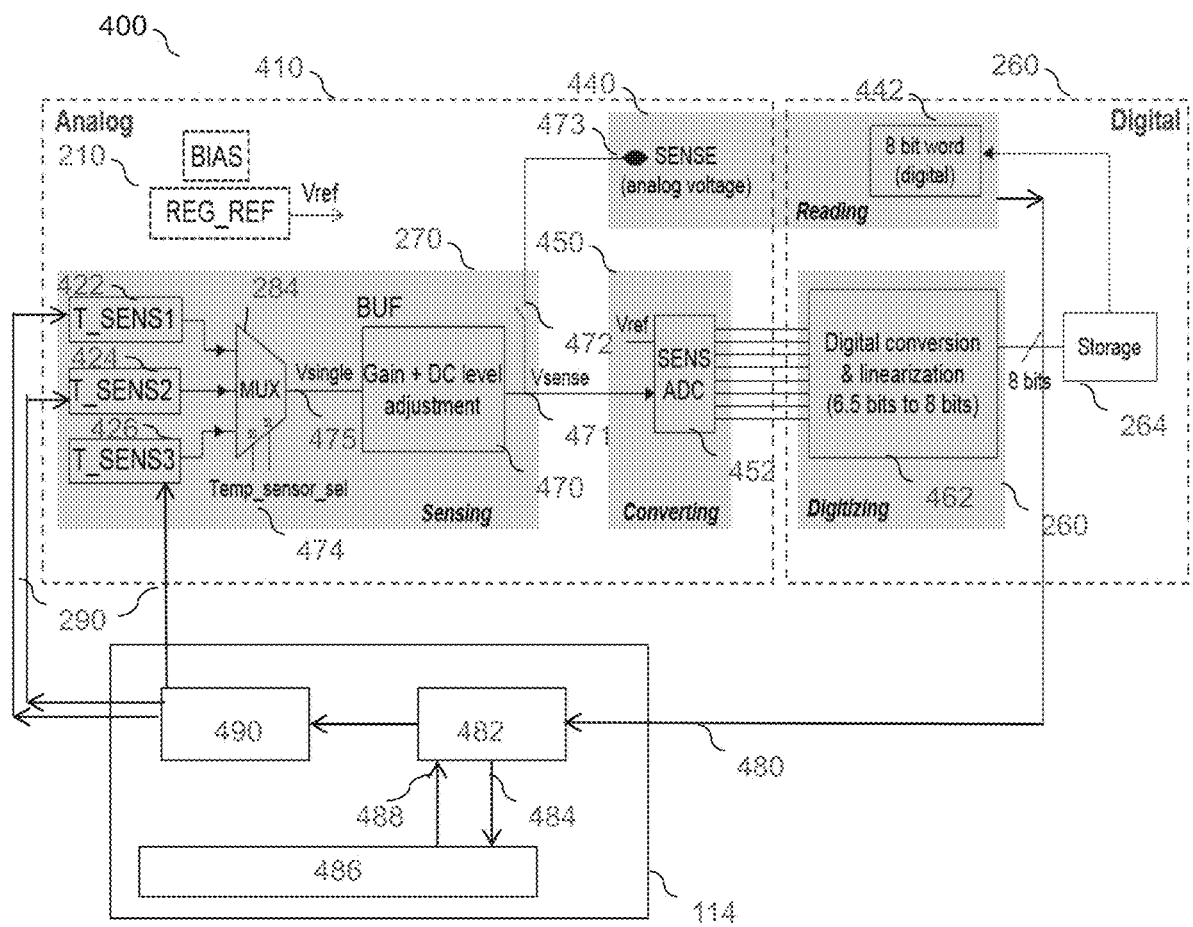
FIG. 4 illustrates a temperature sensor example block diagram, in accordance with examples of the invention.

Referring now to FIG. 4, an example block diagram 400 of a temperature sensor is illustrated, in accordance with examples of the invention. As illustrated, the temperature sensor example block diagram 400 includes, inter alia, four primary operational circuits/units: a sensing unit 270, a converting unit 450, a digitizing unit 260 and a reading unit 440. Ideally, a temperature sensor system has to deal with the following trade-offs: provide high accuracy (for both temperature tracking and programmable over-temperature shutdown), support in both analog and digital circuits in order to read the sensed temperature, limit the area taken on the chip to implement temperature sensing, as well as have low current consumption in order to avoid self-heating and power dissipation.

In some examples, the sensing unit 270 is composed of two stages: a first stage 505 includes a number of, for example, two-diode based sensors 422, 424, 426. In other examples, other sensors can be used. In this example, a differential signal is amplified and converted to a single-ended signal. The sensing unit (T_SENS1 . . . T_SENS3) 422, 424, 426 circuitry is detailed in FIG. 5 ($1^{st}$ stage 505). A multiplexer 284 is configured to select one signal (or value) from the first stage in a polling operation between multiple selectable temperature signals (or values), based on a temperature sensor select control signal 474 and provides a single $V_{single}$ signal to a second stage (550 in FIG. 5), which in this example is a buffer 470. This second (buffer 470) stage is advantageously common for all the temperature sensors, in order to save area and reduce current consumption. In this example, the second buffer 470 stage performs both amplification (to increase sensor sensitivity) and DC level adjustment (to correct any offset error). A $V_{sense}$ signal 471 output from the second buffer 470 stage is input to a sensor analog-to-digital converter (ADC) 452 in order to convert the analog data that is representative of the temperature of the radar device measured at a specific location into a digital form. In some examples, a Flash-like ADC may be used, for example with two different ranges, whereby one range is configured to provide more resolution than the other range in order to improve accuracy at the hot temperatures.

In this manner, multiple temperatures are measured at different locations of the chip where a useful and significant portion of circuitry may be shared across all temperature sensors, e.g. the buffer 470 and sensor ADC 452, with just one temperature measurement being selected. In this example, the sensor ADC 452 is a single input ADC to limit the chip area used. A Flash-like structure for the ADC is chosen to be able to perform the analog-digital conversion even without a clock, in order to facilitate temperature measurements being monitored even in an IDLE state (or sleep state, where normally no clock is running). Thus, in this example and even when there should be minimal heat generated in an IDLE state, it is possible to monitor potential problems, such as the circuit being again re-started with a still too-high temperature after an over-temp shutdown. The sensor ADC 452 uses a reference voltage $V_{ref}$, for example provided by a regulator in the power management unit 210. In some examples, at the output of the sensor ADC 452, a thermometric code is used to transfer the data into a digital form. The digitizing unit 260 performs a number of different operations. Firstly, the thermometric code is converted into a binary code, equivalent to, say, 6.5 bits in this example. As the flash-like sensor ADC 452 has, in some examples, two ranges with different resolutions, the slope of the code (in temperature) may not be linear. A digital conversion and linearization may thus be performed in digital converter circuit 462, providing, say, a code with 8 bits. This 8-bit digital value is then stored into a register, such as storage device 264 of FIG. 2. The reading unit 440 is configured to read an image of the temperature, which is advantageously possible to be read in analog form, by routing the $V_{sense}$ signal 471 on a pin (SENSE pin) 473, as well as the digital stored value being readable in digital form.

In order to avoid the inherent glitches that would occur with switching (polling) between multiple sensors, a single temperature sensor reading may be selected. Furthermore, in some examples, an accurate temperature sensor system, using a single Flash-like ADC, may be used. Advantageously, examples of the invention also support temperature reading measurements in both or either of the analog domain and digital domain.

In accordance with examples of the invention, the controller 114 applies an over-temperature force signal 290 in each temperature sensor (T_SENS1 ... T_SENS3) 422, 424, 426) within the sensing unit to force this specific sensor to go into a region that represents an out-of-range condition (value higher than the preselected threshold), and emulates an over-temperature situation, independent of its actual temperature. In this manner, the controller 114 consequently emulates an over-temperature condition. In some examples, the over-temperature force signal 290 is successively implemented in all 3 (or more) sensors of the sensing unit, and controlled by the radar device state machine during a BIST mode of operation. The use of the over-temperature force signal 290 to emulate an over-temperature condition to the temperature sensor 304 enables the controller 114 to identify signal levels that will occur in a true over-temperature situation. This information is collated and analysed by the digital controller 114 during the test mode of operation.

Figure 5:
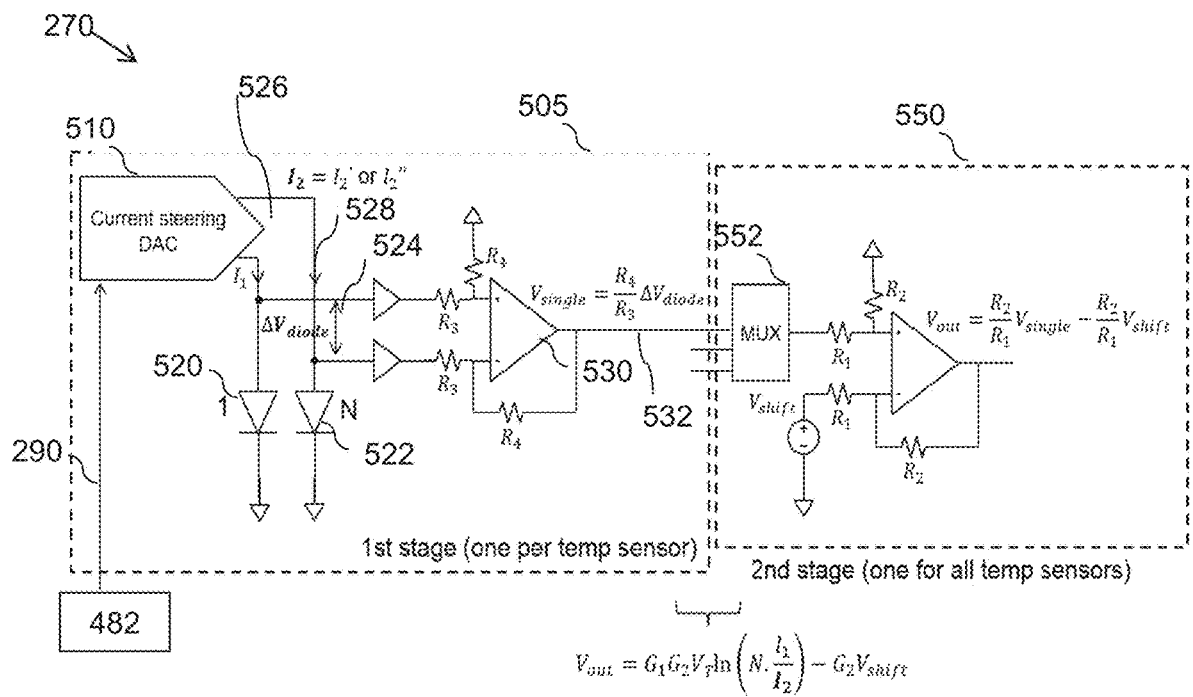
FIG. 5 illustrates an example temperature sensor circuit diagram, in accordance with some examples of the invention.

Thus, an increase of Vsingle 475 (for example an analog output voltage of the first temperature sensor stage 422 through increase of ΔVdiode inside 422) causes the sensor output voltage Vout (Vsense 471 in FIG. 4) to increase. This places the temperature sensor unit 270 into a clamped condition (analog and consequently digital), which would in accordance with examples of the invention emulate an over-temperature state. In some examples, this is performed by decreasing a second diode (I2) current during a BIST operational state, as illustrated in FIG. 5. In this example, the second diode (I2) current may be controlled by the digital signal 'over-temp_force', provided from the BIST engine. During a safety mode of operation (i.e. a BIST state), the over-temp_force signal is a high logic ('1'), and a current steering digital-to-analog converter (DAC) (located in each temperature sensor 422, 424, 426) is configured to provide a very low-level controlled current value (I2=I2") into one of the diodes during the safety mode of operation. In other examples, it is envisaged that the concept of providing a very low-level controlled current value may be achieved using other circuits or components, and thus the concepts herein described are not limited to a use of current steering DACs. When the checks on the status of the BIST state are finished, a 'BIST ready' signal 484 is issued by the BIST engine 482. In this example, an 'over-temp_force' signal 290 is set as a low logic ('0'), and a higher current value (I2=I2') is provided by the current steering DAC. This last current value represents the required current for the functional mode of operation. In examples, of the invention, emulation of an over-temperature condition is performed though fault injection at an early stage (e.g. first stage 505 of FIG. 5, preferably) of the system. In some examples, the fault injection causes a change in, say, a current value in this example, which improves the latent fault coverage of the full temperature sensor system.

In accordance with examples of the invention, the temperature sensor unit 270 is controlled by the device's digital controller 114. The digital controller 114 is configured to trigger the BIST engine 482 that is configured to emulate an over-temperature condition at each temperature sensor (T_SENS1 ... T_SENS3) 422, 424, 426 at a particular time. In this example, the BIST state is defined as a safe state where all the safety related measurements and checks are implemented, and this before the sensor is placed in 'normal functional' state. The BIST engine 482 is enabled by a state machine 486 via a BIST enable signal (en_BIST) 488. Then, a fault injection is performed (where no 'true' interrupt is generated to the digital controller 114). In some examples, the fault injection may be performed during the BIST state, using a change of current, for example, as described previously. Following a fault injection, a BIST engine output signal (BIST_ready) 484 is created. The BIST engine output signal (BIST_ready) 484 indicates, in this example, that all the BIST state tests have been passed, and that the radar device can be put in a normal operation condition. This ensures that any eventual over-temperature condition that was seen in the radar device is a 'real' over-temperature state, which could damage the device and corrupt data, and not a defect in the temp sensor system chain. Appropriate action can then be taken, e.g. shut-down of the device.

Thus, in examples of the invention, the temperature sensor system is configured to deal with the following trade-off: high accuracy (for example for temperature tracking and programmable over-temperature shutdown) within limited PCB space taken on the chip, versus having a low current consumption in order to avoid self-heating and power dissipation. In some examples of the invention, the multiple temperature sensors may be configured to read temperatures in either or both analog and digital form.

Referring now to FIG. 5, an example temperature sensor unit 270 is illustrated, in accordance with some examples of the invention. In this example, temperature sensor unit 270, is composed of two stages: a first stage 505 that includes a current steering digital-to-analog converter (DAC) 510 coupled to a two-diode 520, 522 based sensor. In some examples of the invention, an over-temperature force signal 290 is injected into the current steering DAC 510 within the temperature sensor unit 270 in order to change one of the diode currents, e.g. diode-N 522 (N being a multiple of unitary diode, 522=N×520), and to thereby affect the voltage at the output of the differential to single-ended amplifier 530, thereby emulating a fault injection. As such, examples of the invention reside in this first stage 505 of a temperature sensor unit 270.

In this example, the current steering DAC 510 outputs a differential signal 526 that is amplified in differential to single-ended amplifier 530 and converted to a single-ended signal. This first stage 505 is unique for each temperature sensor, e.g. temperature sensors (T_SENS1 ... T_SENS3) 422, 424, 426 of FIG. 4. In other example circuit designs, it is envisaged that the current steering DAC 510 may output a single-ended signal into a single diode, in which case no conversion to a single-ended signal using a differential to single-ended amplifier 530 is needed. In other example implementations, as mentioned above, it is envisaged that the sensing unit may be a digital sensing unit.

Thus, an increase in the output voltage Vsingle 532 (for example an analog output voltage of the first temperature sensor stage 422) is achieved due to an increase in the ΔVdiode 524, due to the differential diode currents output by the current steering DAC 510. These differential diode currents are created in examples of the invention by the injection of the over-temperature force signal 290 into the current steering DAC 510. The injection of the over-temperature force signal 290 into the current steering DAC 510 causes the temperature sensor unit 270 to transition into a clamped condition (either analog or digital dependent upon the circuit implementation), which in accordance with examples of the invention emulates an over-temperature state.

In some examples, this over-temperature is achieved by decreasing the I2 current 528 during a BIST operational state, which in this example controlled by the digital over-temperature force signal 290, provided from the BIST engine 482. During a safety mode of operation (i.e. a BIST state), the over-temperature force signal 290 is a high logic level ('1'), and each current steering DAC 510 (located in each temperature sensor 422, 424, 426 of FIG. 4) is configured to provide a very low-level controlled current value (I2=I2') 528 into one of the diodes 522 during the safety mode of operation. When the checks on the status of the BIST state are completed, a 'BIST ready' signal is issued by the BIST engine 482. In this example, the over-temperature force signal 290 is changed to a low logic level ('0'), thereby creating a higher current value (I2=I2') provided by the current steering DAC 510 to the differential to single-ended amplifier 530 via the two diodes 520, 522. This last current value represents the required current for the functional mode.

For completeness, a second stage 550 receives each of the respective temperature sensor outputs and commences with a multiplexer 552 that is configured to select one temperature sense signal from the multiple first stages 505 and provides the analog signal (Vsingle on FIG. 2) to the second stage 550 (BUF 470 in FIG. 4). This second stage 550 is common for all the temperature sensors 270 in order to save area and reduce current consumption. It performs both amplification and DC level adjustment: It outputs the final analog voltage (Vsense signal 471 in FIG. 4). The Vsense signal 471 is passed into the SENS ADC in FIG. 4 for the converting operation. Examples of the invention are described with reference to a Flash-like ADC with two different ranges. Although examples of the invention are described with reference to a shared second stage 550, it is envisaged that in other examples different implementations and combinations may be employed, for example dependent upon any constraint at IC level. For example, in some example implementations, a circuit may not share the second stage 550 and employ multiple second stage 550 (e.g. having one per temperature sensor), and the multiplexer 552 located after all second stages. In other examples, t is envisaged that the system may be implemented with no stage sharing at all (e.g. no multiplexer 552, and one buffer, one ADC per sensed location). In other examples, different ADCs may be used, and the described Flash-like ADC is one such example. In other examples, the ADC or Flash-like ADC may be configured to operate with one, three or more ranges in other implementations.

In the described examples, the over-temperature value may be checked digitally. However, in other envisaged examples, the over-temperature value may be checked in an analog form, and thus no ADC will be required. In this example, the output analog voltage would be compared to a reference voltage, and as long as the first measured value is lower than the second measured value the circuit is in a safety operational mode. However, in this example, if the measured analog voltage becomes higher than the reference voltage, an over-temperature condition is identified and the shutdown may be activated.

In accordance with some examples of the invention, the sensing unit 270 is shown being coupled to the BIST engine 482 (of say controller 114 of FIG. 1) that includes a circuit (or software or firmware) configured to emulate an over-temperature condition according to examples of the invention by injecting an over-temperature force signal 290 into the current steering DAC 510. Only one temperature sensor is shown for the sake of simplicity. The temperature sensor transfer function is given by the expression in equation [1]:

$$V_{out} = G_1 G_2 V_T \ln\left(N\frac{I_1}{I_2}\right) - G_2 V_{shift}. \quad [1]$$

Since the output voltage depends on the differential voltage across the two diodes, as illustrated below in equation [2] the proposal is to change one of the current of a diode:

$$\left(\Delta V_{diode} = V_T \ln\left(N\frac{I_1}{I_2}\right)\right). \quad [2]$$

The proposed solution provides certain advantages in terms of latent fault coverage. First, all four units (sensing, converting, digitizing and reading) are verified using a known condition. Since the injections of an over-temperature force signal 290 into each current steering DAC is performed independently in all three inputs of the chain, it is easy to justify a high-level of coverage when the observed temperature result is the same amongst them. The entire chain is tested, including the common parts, with three different inputs. Again, this helps claiming a high-level of coverage. In some examples, the techniques and functionality described herein may be performed during a BIST state of a state machine. Advantageously, one implication of this is that 'Fault Tolerant Time restrictions' associated with a final application of the system may be tailored by the system integrator according to their needs, since BIST state allows selective execution of any test. Finally, another advantage of examples of the invention is the low overhead in terms of additional hardware. One digital bit added by a temperature sensor is required, which changes a diode current.

In examples of the invention, a method for calibrating an out of temperature condition of a temperature sensor system is described. The method may be performed in a frequency modulated (FM) radar unit comprising a plurality of temperature sensors in a temperature sensor system coupled to one or more circuits. The method includes: Injecting an over-temperature force signal into the temperature sensor system; emulating, in response thereto, an over-temperature condition; and determining a true over-temperature condition of the temperature sensor system in response thereto.

Figure 6:
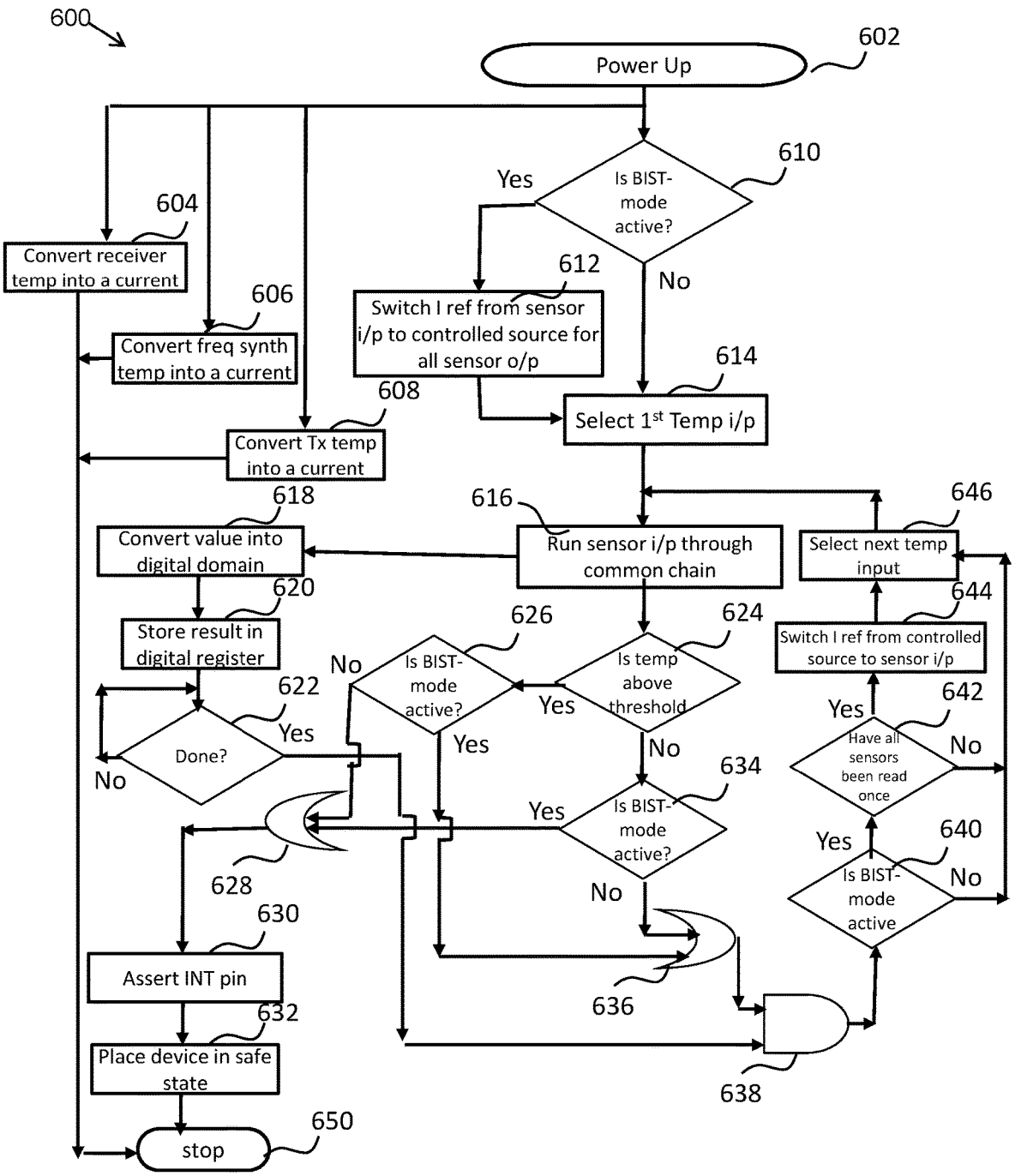
FIG. 6 illustrates an example flow diagram of an over-temperature shutdown emulation, for example for a temperature sensor system of FIG. 2, FIG. 4 or FIG. 5, in accordance with examples of the invention.

FIG. 6 illustrates an example flow diagram 600 of one such over-temperature shutdown emulation method, for example for a temperature sensor system of FIG. 4 and/or FIG. 5, in accordance with examples of the invention. The example flow diagram 600 commences at 602 with a power up of the temperature sensor system. At 604, the receiver temperature is converted into a measurable parameter (e.g. voltage in the illustrated examples). At 606, the frequency synthesizer temperature is converted into a measurable parameter (voltage in the illustrated examples). At 608, the transmit temperature is converted into a measurable parameter (voltage in the illustrated examples).

At 610, a determination is made as to whether (or not) the BIST mode is active. If the BIST mode is active at 610, the current reference is switched from a sensor input to a controlled source for all sensor outputs at 612. Thereafter, or if the determination was that the BIST mode was not active at 610, a first temperature input is selected at 614. At 616, a sensor input is run through a temperature sensor common chain. At 618, in this example, the sensor input value is converted into a digital domain value and the result stored in a digital register at 620. At 622, a determination is made as to whether the digital storage is finished and value is available for an eventual readout.

Referring back to 616, a determination is also made as to whether (or not) the temperature of the sensor common chain is above a threshold at 624. At 626 and 634, a determination is made as to whether (or not) the BIST mode is active. If the temperature of the sensor common chain is above a threshold at 624 and the BIST mode is not active at 626, an input is provided to a first logic 'OR' gate 628. If the temperature of the sensor common chain is not above a threshold at 624 and the BIST mode is active at 634, an input is provided to the first logic 'OR' gate 628. If either of the inputs of the first logic 'OR' gate 628 is a logic '1', then an interrupt pin is asserted at 630 and the device placed in a safe state at 632, before the flowchart stops at 650.

Alternatively, if the temperature of the sensor common chain is above a threshold at 624 and the BIST mode is active at 634, an input is provided to a second logic 'OR' gate 636. If the temperature of the sensor common chain is not above a threshold at 624 and the BIST mode is not active at 634, an input is provided to the second logic 'OR' gate 636. If either of the inputs of the second logic 'OR' gate 636 is a logic '1', then a logic '1' is provided to a logic 'AND' gate 638. Logic 'AND' gate 638 also receives a logic input as soon as the digitally converted and stored sensor result is higher than a threshold in 622. The output from a logic 'AND' gate 638 is then input to 640, where a further determination is made as to whether (or not) the BIST mode is active. If, the BIST mode is not active at 640, then the next temperature input is selected at 646 and the flowchart loops to 616. If, the BIST mode is active at 640, a determination is made at 642 as to whether (or not) all sensors have been read once. If, all sensors have not been read once at 642, then the next temperature input is selected at 646 and the flowchart loops to 616. If all sensors have been read once at 642, then the current reference is switched from a controlled source to a sensor input 644. Then the next temperature input is selected at 646 and the flowchart loops to 616.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented that achieve the same functionality.

Any arrangement of components to achieve the same functionality is effectively 'associated', such that the desired functionality is achieved. Hence, any two components herein combined to achieve a particular functionality can be seen as being 'associated with' each other, such that the desired functionality is achieved, irrespective of architectures or intermediary components. Likewise, any two components so associated can also be viewed as being 'operably connected,' or 'operably coupled,' to each other to achieve the desired functionality. Furthermore, those skilled in the art will recognize that boundaries between the above described operations are merely illustrative. The multiple operations may be executed at least partially overlapping in time. Moreover, alternative example embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in wireless programmable devices or units able to perform the desired device functions by operating in accordance with suitable program code. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A radar device comprises:
   at least one transceiver configured to support frequency modulated (FM) radar signals;
   a digital controller; and
   a temperature sensor system comprising a plurality of temperature sensors coupled to one or more circuits in the at least one transceiver;
   wherein the radar device is characterised in that the digital controller comprises or is operably coupled to an over-temperature emulation circuit configured to emulate an over-temperature shutdown state by injecting an over-temperature force signal into the temperature sensor system, wherein the injection of the over-temperature force signal is configured to intentionally force the temperature sensor system out of a normal operation range limit.

2. The radar device of claim 1 wherein the over-temperature emulation circuit is configured to emulate an over-temperature shutdown state by injecting an over-temperature force signal into the temperature sensor system irrespective of a temperature of a sensor of the plurality of temperature sensors.

3. The radar device of claim 2 wherein the over-temperature emulation circuit is configured to emulate an over-temperature shutdown state by injecting an over-temperature signal successively in each of the plurality of temperature sensors and wherein the digital controller is configured to determine a true over-temperature performance of each of the plurality of temperature sensors based thereon.

4. The radar device of claim 3 wherein the digital controller is configured to read a plurality of temperature values of the plurality of temperature sensors and compare at least one read temperature value with at least one temperature threshold value and in response to the comparison exceeding a threshold, determine a true over-temperature performance of each of the plurality of temperature sensors based thereon.

5. The radar device of claim 2 wherein the digital controller is configured to monitor at least one temperature of the plurality of temperature sensors in both an analog domain and a digital domain.

6. The radar device of claim 2 further comprising a single analog to digital converter, ADC, coupled to an output of the temperature sensor system and configured to support analog to digital conversion of a plurality of temperature sensor values over at least two different ranges, whereby a first temperature range is configured to provide more resolution than a second temperature range in order to improve accuracy at hot temperatures.

7. The radar device of claim 2 wherein the over-temperature emulation circuit is configured to emulate an over-temperature shutdown state during a built-in self-test (BIST) mode of operation.

8. The radar device of claim 1 wherein the digital controller is configured to monitor at least one temperature of the plurality of temperature sensors in both an analog domain and a digital domain.

9. The radar device of claim 1 further comprising a single analog to digital converter, ADC, coupled to an output of the temperature sensor system and configured to support analog to digital conversion of a plurality of temperature sensor values over at least two different ranges, whereby a first temperature range is configured to provide more resolution than a second temperature range in order to improve accuracy at hot temperatures.

10. The radar device of claim 1 wherein the over-temperature emulation circuit is configured to emulate an over-temperature shutdown state during a built-in self-test (BIST) mode of operation.

11. The radar device of claim 1 wherein the injection of the over-temperature force signal that forces the temperature sensor system out of the normal operation range limit causes an over-temperature flag that indicates an out-of-range temperature condition.

12. The radar device of claim 1 wherein the injection of the over-temperature force signal forces a change in a measured physical parameter that is compared with at least one pre-set threshold value, and in response to the measured physical parameter exceeding the at least one pre-set threshold value at least one flag is generated that indicates an out of range temperature condition.

13. A radar device comprises:
   at least one transceiver configured to support frequency modulated (FM) radar signals;
   a digital controller; and
   a temperature sensor system comprising a plurality of temperature sensors coupled to one or more circuits in the at least one transceiver;
   wherein the radar device is characterised in that the digital controller comprises or is operably coupled to an over-temperature emulation circuit configured to emulate an over-temperature shutdown state by injecting an over-temperature force signal into the temperature sensor system wherein the temperature sensor system comprises a two-stage process and the injection of the over-temperature force signal is applied in a first stage of the temperature sensor system.

14. The radar device of claim 13 wherein the over-temperature emulation circuit is configured to emulate an over-temperature shutdown state by injecting an over-temperature force signal into the temperature sensor system irrespective of a temperature of a sensor of the plurality of temperature sensors.

15. The radar device of claim 13 wherein the digital controller is configured to monitor at least one temperature of the plurality of temperature sensors in both an analog domain and a digital domain.

16. The radar device of claim 13 further comprising a single analog to digital converter, ADC, coupled to an output of the temperature sensor system and configured to support analog to digital conversion of a plurality of temperature sensor values over at least two different ranges, whereby a first temperature range is configured to provide more resolution than a second temperature range in order to improve accuracy at hot temperatures.

17. The radar device of claim 13 wherein the injection of the over-temperature force signal forces a change in a measured physical parameter that is compared with at least one pre-set threshold value, and in response to the measured physical parameter exceeding the at least one pre-set threshold value at least one flag is generated that indicates an out of range temperature condition.

18. A temperature sensor system comprising:
at least one transceiver configured to support frequency modulated (FM) radar signals;
a digital controller; and
a temperature sensor system comprising a plurality of temperature sensors coupled to one or more circuits in the at least one transceiver;
wherein the radar device is characterised in that the digital controller comprises or is operably coupled to an over-temperature emulation circuit configured to emulate an over-temperature shutdown state irrespective of a temperature of a sensor of the plurality of temperature sensors, wherein the injection of the over-temperature force signal is configured to intentionally force the temperature sensor system out of a normal operation range limit.

19. A method for calibrating an out of temperature condition of a temperature sensor system comprising a plurality of temperature sensors in a temperature sensor system coupled to one or more circuits, the method characterised by:
injecting an over-temperature force signal into the temperature sensor system;
emulating, in response thereto, an over-temperature condition; and
determining a true over-temperature condition of the temperature sensor system in response thereto,
wherein injecting an over-temperature force signal into the temperature sensor system comprises intentionally forcing the temperature sensor system out of a normal operation range limit.

20. The method of claim 19 wherein emulating, in response to injecting an over-temperature force signal into the temperature sensor system, comprises:
changing a measured physical parameter in the temperature sensor system and
comparing the changed measured physical parameter with at least one pre-set threshold value, and in response to the measured physical parameter exceeding the at least one pre-set threshold value;
generating at least one flag that indicates an out of range temperature condition.

* * * * *